3,736,184
Patented May 29, 1973

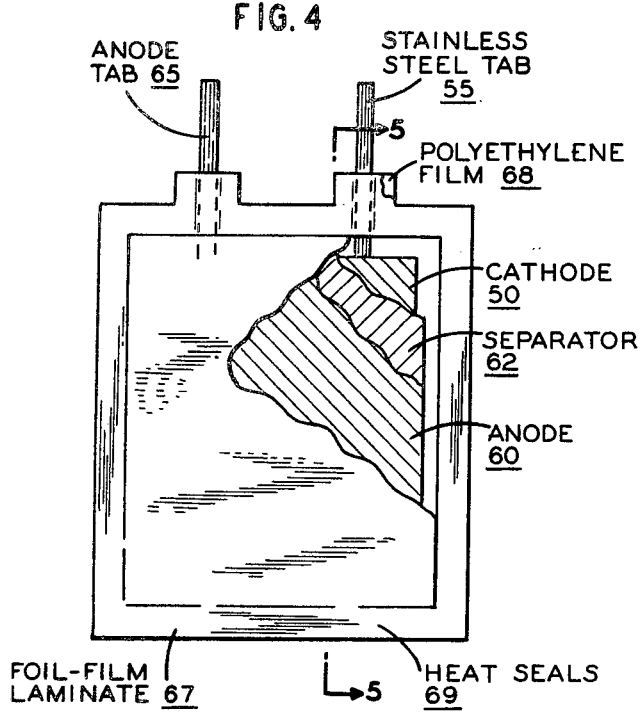
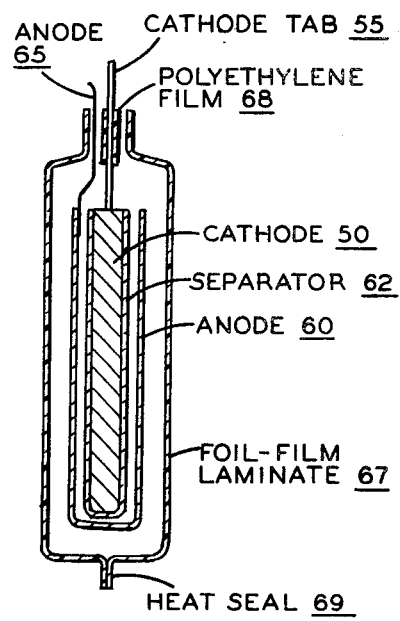
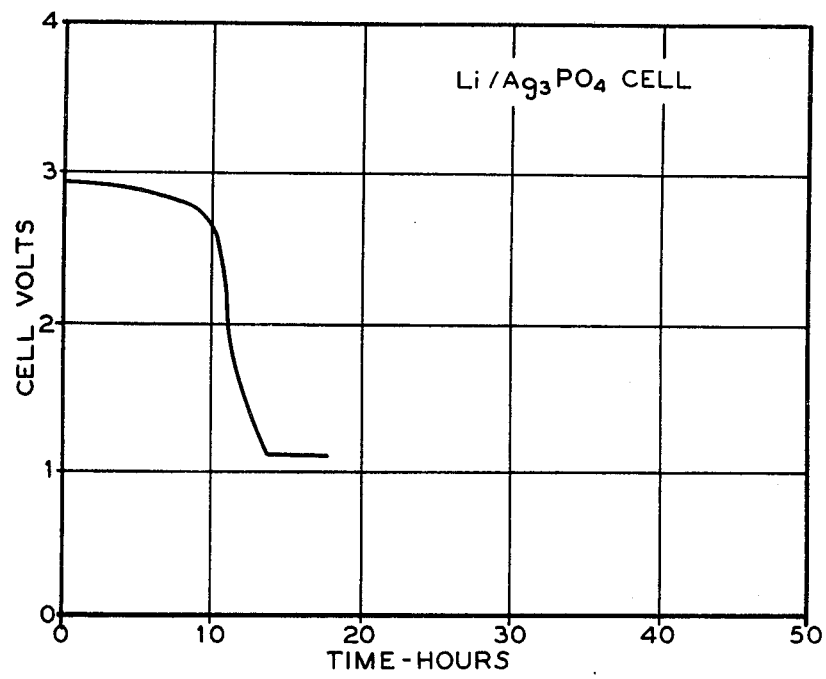

3,736,184
METAL PHOSPHATE AND METAL ARSENATE ORGANIC ELECTROLYTE CELLS
Arabinda N. Dey, Needham, and Robert W. Holmes, Dedham, Mass., assignors to P. R. Mallory & Co., Inc., Indianapolis, Ind.
Filed Mar. 29, 1972, Ser. No. 239,123
Int. Cl. H01m *35/02*
U.S. Cl. 136—6 LN    17 Claims

ABSTRACT OF THE DISCLOSURE

A cathode active material is described utilizing the phosphates and arsenates of copper, iron, silver, cobalt, nickel, mercury, thallium, lead and bismuth. These materials are particularly suitable for use as positive electrodes in non-aqueous electrolyte cells and such electrodes and the cells are described. A method for fabrication of the active material into cathodes is included.

FIELD OF THE INVENTION

This invention relates to high-energy density electrochemical energy generators and more particularly to such generating cells and batteries having organic electrolytes and utilizing as cathodic material the phosphates and arsenates of certain heavy metals.

BACKGROUND OF THE INVENTION

Metal phosphates and arsenates are unstable in acid or alkaline solutions. For this reason it has not previously been possible to use such materials as depolarizers for conventional acid or alkaline primary or secondary cells.

The object of this invention is to provide novel electrode chemical energy generators with:

(a) High voltages
(b) High energy densities
(c) High material utilization efficiencies
(d) No spontaneous gasing This invention is based upon the use, as active cathode material, of the oxy acids of phosphorous and arsenic in the form of their metal salts with certain heavy metals. The phosphates and arsenates of copper, silver, iron, cobalt, nickel, mercury, thallium, lead and bismuth and mixtures thereof are particularly suitable as depolarizers for this invention. Such active cathodic materials are used in conjunction with non-aqueous electrolytes in electrochemical generators. The electrochemical generators for the utilization of such active materials include, as anodic material, active light metals preferably of the type of lithium sodium, potassium, etc.

Within the ambit of this invention are the novel active cathodic materials; cathodes prepared from such novel cathodic material; and methods of making such cathodes from said active materials and the complete electrochemical generators using such active cathodic and anodic materials in conjunction with non-aqueous electrolytes. Broadly stated according to the principles of the present invention, there is provided an electric cell comprising a light metal anode, a heavy metal phosphate or arsenate cathode, and an organic electrolyte.

Light active metal anodes suitable for the purpose of the present invention are selected from among lithium, sodium, potassium, beryllium, calcium, magnesium, and aluminum. In some cases, it is desirable to amalgamate the surface of the anode metal with mercury as the performance of certain light metal anodes for such cells can be considerably improved by such amalgamation. By surface alloying these metals with mercury by chemical displacement of the latter from solutions of a mercury salt, a notable improvement of the anode performance is provided. The improvement is particularly striking with anodes formed of aluminum, magnesium, or their alloys. Amalgamation may be successfully carried out by bringing the anode metal into contact with mercuric salts dissolved in N:N dimethyl formamide, gamma-butyrolactone, acetone or in other suitable solvents. Among useful mercuric salts for such solution are mercuric chloride, mercuric nitrate, mercuric acetate, mercuric chlorate, mercuric bromide and mercuric thiocyanate. Generally speaking the principles of selection of a suitable system (solute-solvent) for amalgamation of the following:

(a) The mercury salt should be soluble in the solvent.
(b) The anion of the mercury salt should form salts with the anode metal, that are also soluble in the solvent employed to dissolve the mercury salt.
(c) The solvent should be stable in the presence of the anode metal and its amalgam, more particularly it should not decompose evolving hydrogen, as would be the case with acetic acid.

The active metal anodes are amalgamated to reduce local action on the anode surface thus providing consistant and reproduceable electrochemical results. Specifically it has been noted, with aluminum and magnesium anodes, that amalgamation assures elimination of the usual time lag for initiation of the current flow. With anodes of such metals and their alloys the usual time lag is reduced to less than $10^{-3}$.

The novel cathodic material or depolarizers used in the present invention are the heavy metal salts of the oxy acids of phosphorous and arsenic. The phosphates and arsenates $(PO^{-4})\equiv$; $(AsO^{-4})\equiv$; of copper, silver, iron, cobalt, nickel, mercury, thallium, lead, and bismuth and mixtures thereof are particularly suitable as the active cathodic or depolarizer materials for cells to be used in conjunction with the above mentioned active light metal anodes.

Suitable electrolytes may be made by dissolving organic or inorganic salts of light metals in the organic solvents. For example, 1–2 molar solutions of lithium perchlorate, or lithium aluminum chloride dissolved in tetrahydrofuran solvent constitute a suitable organic electrolyte. Other light metal salts are based upon the cations of light metals such as lithium, sodium, beryllium, calcium, magnesium or aluminum with the anions such as perchlorate, tetrachloroaluminate, tetrafluoroborate, chloride, hexafluorophosphate, hexafluoroarsenates, etc. dissolved in organic solvents. Among suitable organic solvents are tetrahydrofuran, propylene carbonate, dimethyl sulfide, dimethyl sulfoxide, N-nitrosodimethylamine, gamma-butyrolactone, dimethyl carbonate, methyl formate, butyl formate, acetonitrile and N:N dimethyl formamide.

This invention in addition to the electrochemical system mentioned above also contemplates cells and batteries utilizing this system which are simple in construction, reliable and safe in operation, and which may be readily manufactured and sold on a practical and commercial scale at a low cost. Similarly included within the ambit of this invention is the method of manufacture of the cathodes from the cathodic materials. These and other aspects and objects and advantages of the present invention will be apparent from the following description taken in conjunction with the accompanying drawing in which:

FIG. 4 shows a side view of a cell according to this invention, in its individually sealed envelope useful according to another aspect. FIG. 5 shows a sectional view of the cell according to FIG. 4, said section being taken along lines 5—5 of FIG. 4.

Figure 7:
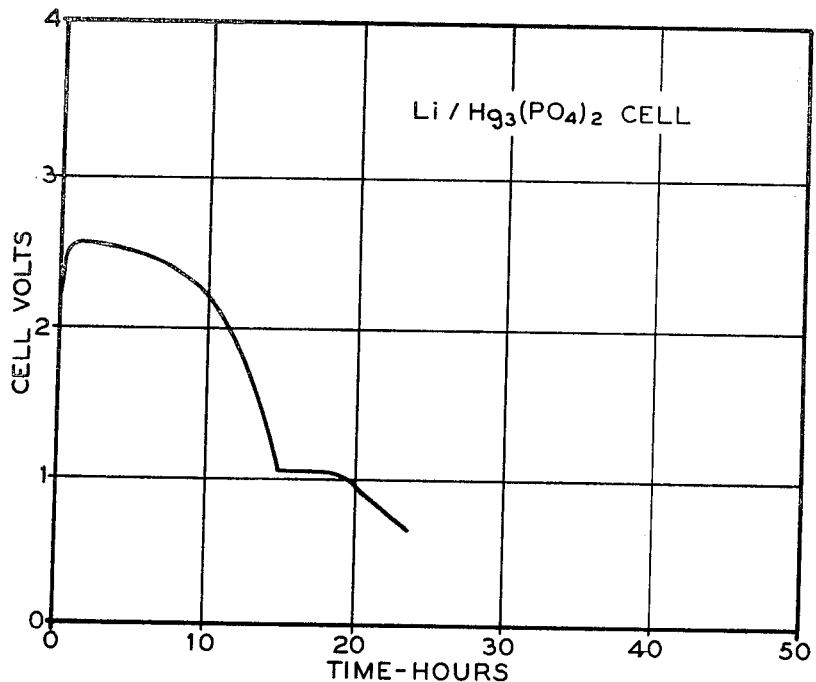
Figure 8:
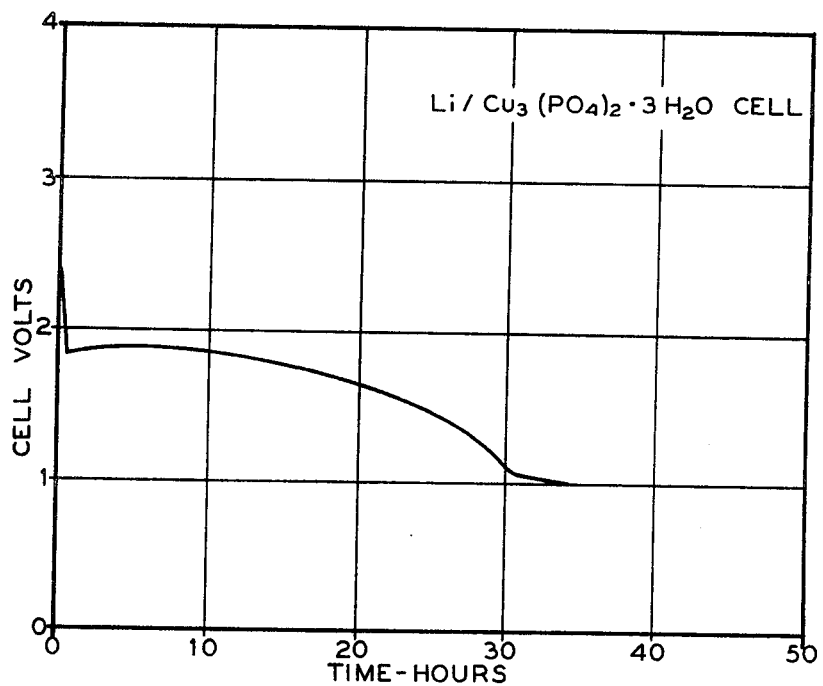
Figure 9:
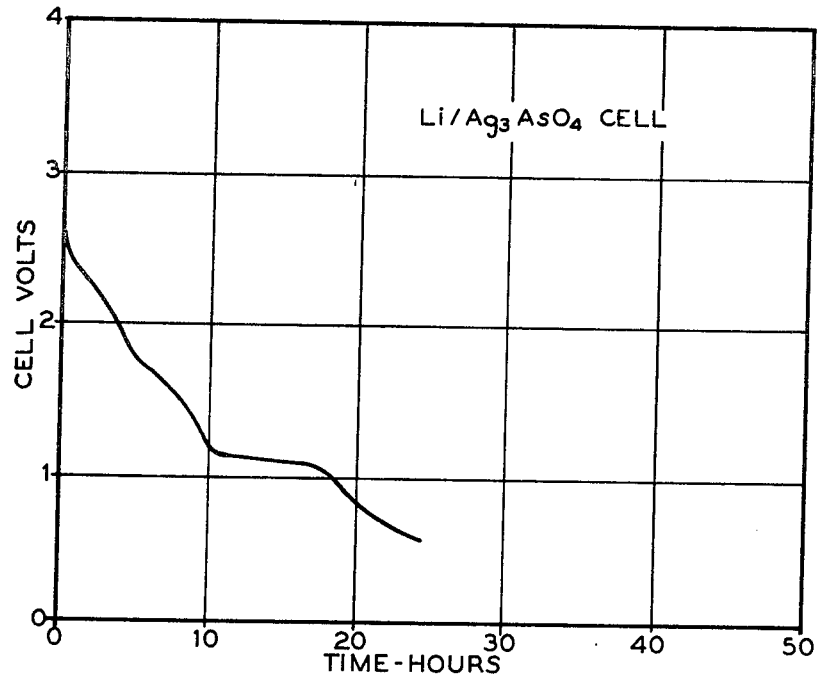
Figure 10:
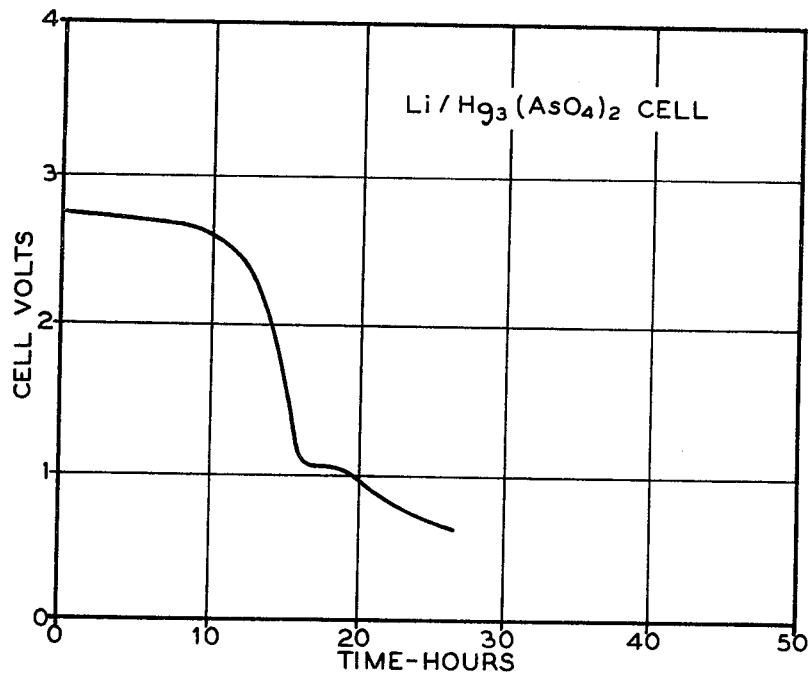
Figure 11:
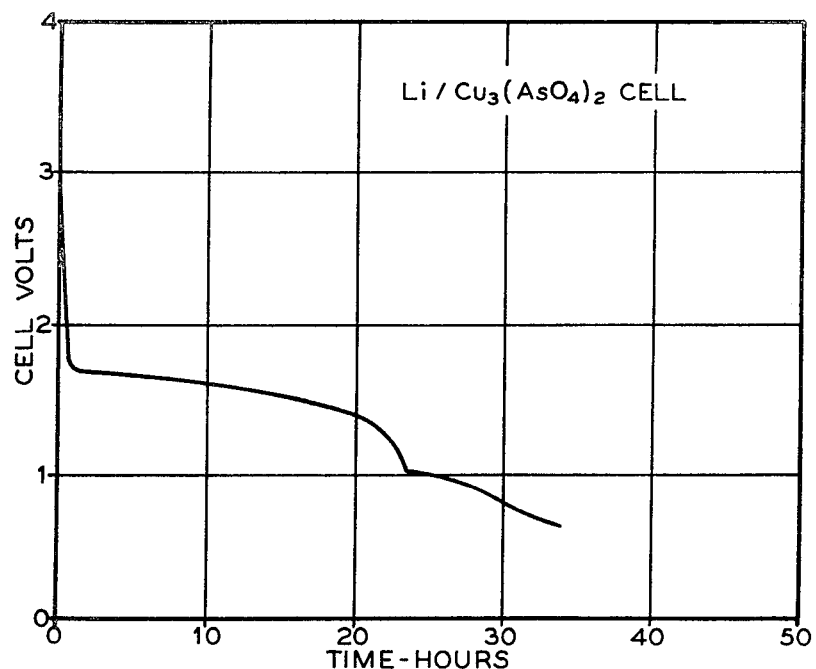
Figure 12:
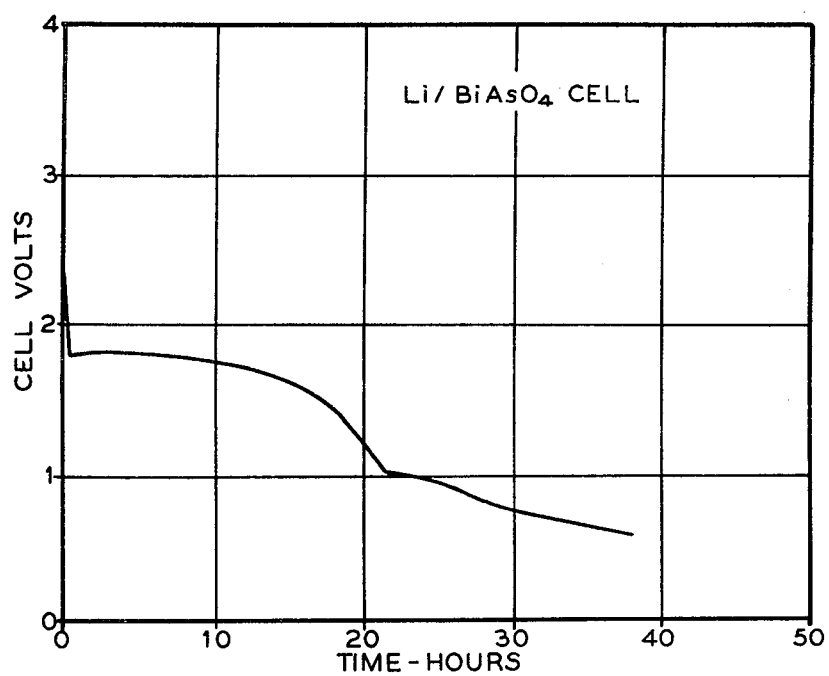

FIG. 6 is a discharge curve of a lithium silver phosphate cell according to this invention. FIG. 7 is a discharge curve of a lithium mercuric phosphate cell. FIG. 8 is a discharge curve of a lithium cupric phosphate cell. FIG. 9 is a discharge curve of a lithium silver arsenate cell. FIG. 10 is a discharge curve of a mercuric arsenate cell. FIG. 11 is a discharge curve of a cupric arsenate cell. FIG. 12 is a discharge curve of a lithium bismuth arsenate cell.

Figure 1:
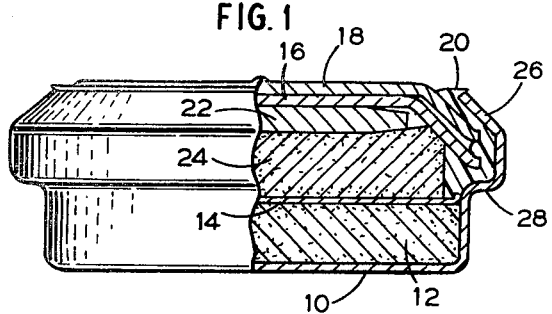
FIG. 1 is a vertical sectional view, having parts in elevation embodying a commercial cell according to this invention.

Referring now particularly to FIG. 1 of the drawing, the structure used and the procedure followed in assembling a practical cell and embodying this one aspect of this invention will be described.

Reference numeral 10 denotes a cathode container made of stainless steel, in which there is compressed a body of cathode mix 12. This cathode mix employing the cathodic material of this invention is a pre-mixed and pre-slugged mixture of the powdered depolarizer comprising the heavy metal phosphates or arsenates and graphite or any similar conductive carbon in a weight ratio of approximately seven parts of depolarizer to three parts of graphite. The pre-mixture is bonded with approximately 3% by weight of a aqueous dispersion of polytetrafluoroethylene commercially available as colloidal Teflon (Du Pont de Nemours Co. Inc.). After the water in the dispersion has been displaced by an organic solvent such as isopropanol or benzene the cathodic mixture is compressed. After compression, it is preferred to dry and cure the previously compressed cathode mixture at temperatures of approximately 300° C. for about 2 hours. A thin barrier or separator layer 14 of a microporous inert material such as fiber glass is then placed in the cathode container 10 on top of the compressed cathode mix 12.

The top closure of the can comprises inner top disc 16 made of stainless steel and outer top disc 18, likewise made of stainless steel, the two top discs having their center portions nested in and their edge portions slightly separated from each other. An insulating and sealing gromet 20 of a suitable elastomer such as neoprene of polyethylene, is stretched or molded around the circumferential edges of top discs 16 and 18. A detailed description of the assembly and operation of this so called "double top" structure will be found in Williams Pat. 2,712,565 and Clune Pat. 3,096,217 to which reference is hereby made. In inner top disc 16 there is anode 22 cut from a plate of the anode metal, for example lithium, to fit the inner dimension of said disc. A body of an electrolyte absorbent 24, such as cotton is interposed between anode 22 and the cathode mix 12. Onto this electrolyte absorbent 24 is deposited about 0.5 cc. of an electrolyte such as 1 molar lithium perchlorate dissolved in propylene carbonate. Thereupon, the cell is assembled and permanently sealed by crimping down enlarged mouth portions 26 of cathode container 10 over gromet 20 which is thus strongly compressed between the said mouth portions and the annular shoulder 28 of the container. Any excess electrolyte present is squeezed out during the final assembly of the cell.

Figure 2:
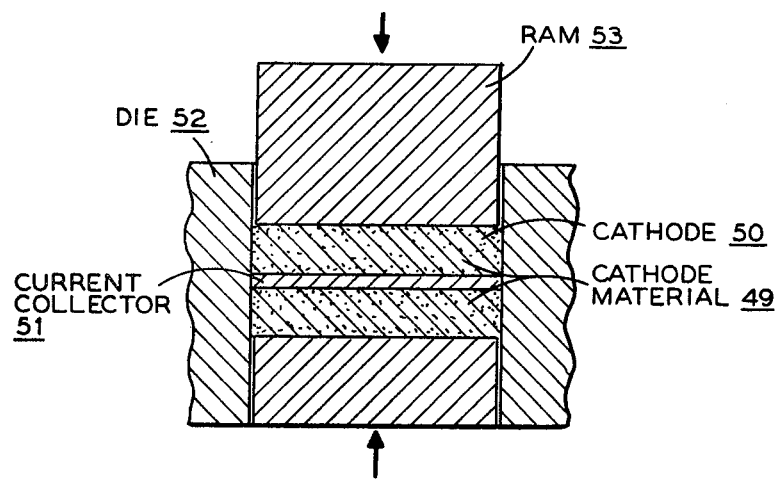
FIG. 2 shows a method of manufacture of the cathode, according to one aspect of this invention at the stage where the material is ready for compression in a molding die.
Figure 3:
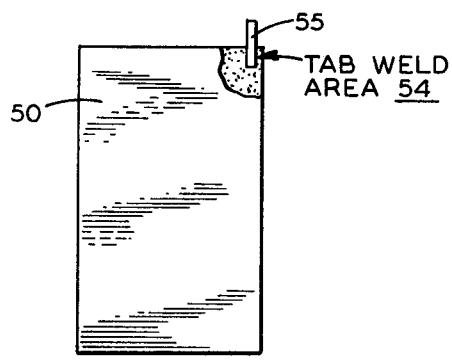
FIG. 3 shows a finished cathode, according to one aspect of this invention, including a tab-welded area for affixing current collecting leads to the current collectors.

FIGS. 2 and 3 show a schematic method for manufacture of cathodes useful in the manufacture of sealed individual cells which may be assembled into batteries. In the cathode construction according to this aspect of the invention, the cathodes 50 are fabricated by comprising a pre-mixed and pre-slugged mixture 49 of powdered depolarizer and graphite in a 7:3 weight ratio with approximately 3 parts by weight of a binder. The preferred binder is 3% by weight of a aqueous dispersion of polytetrafluoroethylene, commonly known as colloidal Teflon (Du Pont de Nemours Co. Inc.). The water of this aqueous dispersion is then displaced by adding a sufficient amount of an organic solvent such as isopropanol, benzene, etc. to form a paste to the mix. The paste is then thoroughly mixed to form a easily pliable dough. Any excess solvent is decanted. The cathodes 50 are molded on and around nickel current collector 51, preferably fabricated from metal screening or expanded metal, by placing layers of the dough, above and below the current collector 51 which is in turn placed in a rectangular die 52 and then pressing the dough at pressures 70–80,000 lbs./in.$^2$ by ram 53. The process is shown schematically in FIG. 2. The excess solvent such as isopropanol is squeezed out of the dough and there results a compact rectangular cathode 50 with adequate mechanical integrity for further treatment. This cathode 50 is then dried in air and preferably cured at a temperature between 200°–350° C. for from 1½ to 3 hours. Optimally the curing treatment is 300° C. for 2 hours. The curing process enhances the mechanical integrity of the cathode even further. The electrical conductivity of such a cathode is more than adequate for its purpose. In the above method, the ratio of active material to graphite or other conductive inert additive and the ratio of the total mix to binder can be varied widely.

The nature of the binder can also be varied to a considerable extent. The binder may include both organic and inorganic compounds. Organic binders in addition to the colloidal Teflon are polyethylene dissolved in xylene, ethyl cellulose dissolved in xylene, and so forth. Other polyolefin polymers may similarly be used. Inorganic binders which may be used include plaster of paris and proprietary phosphate dental cements. The purpose of the pressure is to mechanically consolidate the cathode mixture. The preferred pressure is 70,000 lbs./in.$^2$.

When curing the cathodes, the curing temperature can be varied from 100° C. to 400° C. and the curing time should be varied according to the temperature with the curing time decreasing with increases in the temperature.

A corner 54 of the cathode 50, after the heat treatment according to the above procedure, is scraped to bare a portion of the current collector 51 to which a tab 55 is spot welded for electrical connection. The finished cathode is shown in FIG. 3. This cathode, used in conjunction with lithium anodes, is shown in a side view of the cell at FIG. 4 including partial cut-outs.

A section of FIG. 4 along lines 5—5 is shown in FIG. 5. The cathode 50 is used in conjunction with two lithium anodes 60, prepared by pressing two rectangular pieces of lithium metal approximately 0.02 inch thick, on expanded stainless steel. This cell is constructed in parallel plate configuration. A layer of filter paper 62 is interposed between the lithium anode 60 and the cathode 50 to provide a separator and electrolyte absorber 62. The cell is enclosed in a polymer and foil-laminate enclosure 67 prepared according to the method of packaging and sealing described in co-pending patent application Ser. No. 822,661, filed May 7, 1969, entitled "Expandable Casing for Electrochemical Cells" and assigned to the present assignee. These foil-laminate film cells are heat-sealed around the periphery preferably by heat seals 69. At the upper end where the cathode tabs 55 and anode tabs 66 leave the cell structure, proper portions of polyethylene film 68 are affixed to the tabs to provide leak-proof seals. Before sealing the cells, 3 cc. of 1.0 molar solution of lithium perchlorate (LiClO$_4$) in tetrahydrofuran is added to each cell enclosure and the cell is permanently heat sealed. The cells according to this construction are cathode limited, i.e. the cathode has a lower capacity than the anode. They may be assembled into batteries by either series or parallel connections.

OPERATION

All the cells are discharged using a constant current of 4.5 ma. corresponding to a current density of 1 ma./cm.$^2$ based on the geometric area of both the sides of the cathode. This corresponds to a 10-30 hour rate. The opening characteristics of these cells under the above type of load is shown in Table 1.

TABLE I

Operating Characteristics of Various Li/Metal Phosphate and Li/Meta Arsenate Organic Electrolyte Cells

| Example No. | Cell | Curve | Open circuit voltage | Average operating voltage | Cathode material utilization efficiency, percent |
|---|---|---|---|---|---|
| 1 | $Li/Ag_3PO_4$ | Figure 6 | 3.5 | 2.8 | 80 |
| 2 | $Li/Hg_3(PO_4)_2$ | Figure 7 | 3.3 | 2.5 | 90 |
| 3 | $Li/Cu_3(PO_4)_2$ | Figure 8 | 3.0 | 1.8 | 100 |
| 4 | $Li/Ag_3AsO_4$ | Figure 9 | 3.3 | 1.7 | 70 |
| 5 | $Li/Hg_3(AsO_4)_2$ | Figure 10 | 3.4 | 2.7 | 100 |
| 6 | $Li/Cu_3(AsO_4)_2$ | Figure 11 | 3.3 | 1.6 | 90 |
| 7 | $Li/BiAsO_4$ | Figure 12 | 3.2 | 1.7 | 90 |

Note.—Most of the cells showed high open circuit and operating voltages compared to the conventional alkaline cells.

The systems $Li/Ag_3PO_4$, $Li/Hg_3(PO_4)_2$, $$Li/Hg_3(AsO_4)_2$$

are particularly important for their high and exceedingly steady output voltage. The assumed cathode reactions for all these cells are given in Table 2 below:

TABLE 2

$$Ag_3PO_4 + 3\,Li^+ + 3e \longrightarrow 3Ag + Li_3PO_4$$
$$Hg_3(PO_4)_2 + 6\,Li^+ + 6e \longrightarrow 3Hg + 2Li_3PO_4$$
$$Cu_3(PO_4)_2 + 6\,Li^+ + 6e \longrightarrow 3Cu + 2Li_3PO_4$$
$$Ag_3AsO_4 + 3Li^+ + 3e \longrightarrow 3Ag + Li_3AsO_4$$
$$Hg_3(AsO_4)_2 + 6Li^+ + 6e \longrightarrow 3Hg + 2Li_3AsO_4$$
$$Cu_3(AsO_4)_2 + 6\,Li^+ + 6e \longrightarrow 3Cu + 2Li_3AsO_4$$
$$BiAsO_4 + 3Li^+ + 3e \longrightarrow Bi + Li_3AsO_4$$

Note.—The anodic reaction in all the above cells is $Li \longrightarrow Li^+ + e$.

For the lithium anode there may be substituted, in molar proportion, sodium, potassium, rubidium, and cesium. Stoichiometric equivalents of beryllium, calcium, magnesium, barium, and strontium, and aluminum may be substituted for the lithium.

The present invention has been disclosed by reference to preferred embodiments thereof. However, variations and modifications may be resorted to by those skilled in the art without departing from the principles of this invention. All the variations and modifications are considered to be within the true spirit and scope and of the present invention as disclosed in the foregoing description and including present art recognized equivalents for the various components.

What is claimed is:

1. An electrochemical energy-generating cell comprising (a) at least one positive electrode; (b) at least one negative electrode; (c) an organic electrolyte, with said electrodes disposed therein; said positive electrode comprising a cathodic material selected from the group consisting of phosphates, or arsenates of heavy metals selected from the group consisting of copper, silver, iron, cobalt, nickel, mercury, thallium, lead and bismuth, and mixtures thereof; said negative electrode comprising an active light metal selected from the group consisting of lithium, sodium, potassium, beryllium, calcium, magnesium and aluminum and alloys thereof; and said organic electrolyte comprising a polar organic solvent having dissolved therein at least one ion-forming salt of an active light metal.

2. The cell according to claim 1 wherein said polar solvent is selected from the group consisting of tetrahydrofuran, N-nitrosodimethylamine, dimethyl sulfite, propylene carbonate, dimethyl sulfoxide, gamma-butyrolactone, dimethyl carbonate, methyl formate, butyl formate, acetonitrile and N:N dimethyl formamide.

3. The cell according to claim 2, wherein the salt dissolved in said polar organic solvent is selected from the group consisting of active light metal salts of perchlorates, tetrachloroaluminates, tetrafluoroborates, chlorides, hexafluorophosphates, and hexafluoroarsenates.

4. The cell according to claim 1, wherein the cathodic active material is silver phosphate.

5. The cell according to claim 1, wherein the cathodic active material is mercuric phosphate.

6. The cell according to claim 1, wherein the cathodic active material is mercuric arsenate.

7. A cathodic electrode composition for non-aqueous electrochemical energy generators according to claim 1 comprising the phosphates or arsenates of heavy metals selected from the group consisting of silver, copper, iron, cobalt, nickel, mercury, thallium, lead and bismuth as cathode active material and electrochemically inert conductive material and a binder.

8. The cathodic electrode compositions according to claim 7 wherein the electrochemically inert conductive material is graphite.

9. The cathodic electrode composition according to claim 7 wherein the cathode active material is silver phosphate.

10. The cathodic electrode composition according to claim 7 wherein the cathode active material is mercuric phosphate.

11. The cathodic electrode composition according to claim 7 wherein the cathode is mercuric arsenate.

12. The cathode electrode composition according to claim 7 wherein the binder is polytetrafluoroethylene.

13. A method for the preparation of cathodic electrodes according to claim 7 comprising the phosphates or arsenates of heavy metals according to claim 7 which comprises mixing said phosphates or arsenates with an electrochemically inert material electrically more conductive than said phosphates or arsenates admixing a binder thereto, then compressing said admixed material into the form of an electrode and then curing the formed electrode.

14. The method according to claim 13 wherein the compression is performed at pressures within the range of 2,000 lbs./in.$^2$ to 150,000 lbs./in.$^2$.

15. The method according to claim 14 wherein the pressure is approximately 70,000 lbs./in.$^2$.

16. The method according to claim 13 wherein the curing of the formed cathode is accomplished at a temperature within the range of 100° C. to 400° C.

17. The method according to claim 16 wherein the curing is performed at a temperature of substantially 300° C. for about 2 hours.

References Cited
UNITED STATES PATENTS

| 1,262,019 | 4/1918 | Conrad | 136—137 |
| 2,800,520 | 7/1957 | McGraw | 136—102 |
| 3,532,552 | 10/1970 | Cohen et al. | 136—100 |
| 3,532,553 | 10/1970 | Mucenieks | 136—100 |
| 3,679,484 | 7/1972 | Dey et al. | 136—83 R |

ANTHONY SKAPARS, Primary Examiner

U.S. Cl. X.R.

136—83 R, 137